United States Patent
Broll

(10) Patent No.: US 10,865,120 B2
(45) Date of Patent: Dec. 15, 2020

(54) GREEN PIGMENT

(71) Applicant: Helvetia Pigmente AG, Sempach Station (CH)

(72) Inventor: Sascha Broll, Sempach Station (CH)

(73) Assignee: Helvetia Pigmente AG, Sempach Station (CH)

(*) Notice: Subject to any disclaimer, the term of this patent is extended or adjusted under 35 U.S.C. 154(b) by 448 days.

(21) Appl. No.: 15/910,974

(22) Filed: Mar. 2, 2018

(65) Prior Publication Data
US 2019/0152798 A1 May 23, 2019

(51) Int. Cl.
*C01G 53/00* (2006.01)
*C01G 51/00* (2006.01)
*C09D 7/61* (2018.01)
*C01G 33/00* (2006.01)

(52) U.S. Cl.
CPC ......... *C01G 53/006* (2013.01); *C01G 33/006* (2013.01); *C01G 51/006* (2013.01); *C01G 51/42* (2013.01); *C01G 53/40* (2013.01); *C01G 53/42* (2013.01); *C09D 7/61* (2018.01); *C01P 2002/32* (2013.01); *C01P 2002/72* (2013.01); *C01P 2006/62* (2013.01); *C01P 2006/63* (2013.01); *C01P 2006/64* (2013.01)

(58) Field of Classification Search
None
See application file for complete search history.

(56) References Cited

U.S. PATENT DOCUMENTS 9,187,617 B1 11/2015 Letschert

*Primary Examiner* — Colleen P Dunn
*Assistant Examiner* — Ross J Christie
(74) *Attorney, Agent, or Firm* — Troutman Pepper Hamilton Sanders LLP

(57) ABSTRACT

An inorganic green pigment includes a material with spinel structure of the general formula selected from the following formulas
a) $(A_{1-x}B_{1+x})(C_{3-x-y}D_{2x}B_{1-x-2y}Ni_{3y})O_8$, wherein $0.05 \leq x \leq 0.9$ and $0.05 \leq y \leq 0.5$, and wherein $x+2y \leq 1$;
b) $(A_{1-x}B_{1+x})(C_{3-x-y}D_{2x-y}B_{1-x-y}Ni_{2y})O_8$, wherein $0.05 \leq x \leq 0.5$ and $0.05 \leq y \leq 0.5$;
c) $(A_{1-x}B_{1+x})(C_{3-x-4}D_{2x}B_{1-x+y}Nb_y)O_8$, wherein $0.05 \leq x \leq 0.5$ and $0.05 \leq y \leq 0.2$;
d) $(A_{1-x}B_{1+x})(C_{3-x}D_{2x-2y}B_{1-x+y}Nb_y)O_8$, wherein $0.05 \leq x \leq 0.9$ and $0.05 \leq y \leq 0.2$, and wherein $x \geq y$; and
e) $(A_{1-x}B_{1+x})(C_{3-x-3y}D_{2x}B_{1-x}Nb_{2y}Ni_y)O_8$, wherein $0.05 \leq x \leq 0.9$ and $0.05 \leq y \leq 0.2$,
wherein A is at least one element selected from Co, Zn, Ca, Mg and Cu,
wherein B is at least one element selected from Li and Na,
wherein C is at least one element selected from Ti, Mn, Sn and Ge, and
wherein D is at least one element selected from Cr, B, Fe, Mn and Al.

8 Claims, 5 Drawing Sheets

GREEN PIGMENT

CROSS-REFERENCES TO RELATED APPLICATIONS

This application claims the priority of European Patent Application, Serial No. EP17202595.9, filed Nov. 20, 2017, pursuant to 35 U.S.C. 119(a)-(d), the content of which is incorporated herein by reference in its entirety as if fully set forth herein.

BACKGROUND OF THE INVENTION

The present invention relates to an inorganic green pigment and a method for the production thereof.

The following discussion of related art is provided to assist the reader in understanding the advantages of the invention, and is not to be construed as an admission that this related art is prior art to this invention.

Pigments can be used in various applications such as paints, varnishes, plastics, glass products and ceramics. Hereby inorganic pigments have the advantage of being resistant against influences such as light, heat or acids and lyes.

Selective absorption and reflection of defined wavelengths of visible light causes pigments to appear in their colors. When white light hits a dyed pigment some wavelengths are absorbed due to interaction of these wavelengths with the structure of the pigment. The non-absorbed wavelengths are reflected back to the observer which results in the appearance of the color.

Many pigments are known in the state of the art. However, oftentimes the handling of these pigments presents health risks for the user.

It would therefore be desirable and advantageous to provide an improved inorganic green pigment which has a good color tone and in addition presents no health risks.

SUMMARY OF THE INVENTION

According to one aspect of the present invention, a green pigment includes a material with spinel structure of the general formula:

$(A_{1-x}B_{1+x})(C_{3-x-y}D_{2x}B_{1-x-2y}Ni_{3y})O_8$, wherein $0.05 \leq x \leq 0.9$ and $0.05 \leq y \leq 0.5$, and wherein $x+2y \leq 1$;

or $(A_{1-x}B_{1+x})(C_{3-x-y}D_{2x-y}B_{1-x-y}Ni_{2y})O_8$, wherein $0.05 \leq x \leq 0.5$ and $0.05 \leq y \leq 0.5$;

or $(A_{1-x}B_{1+x})(C_{3-x-4y}D_{2x-2y}B_{1-x+y}Nb_y)O_8$ wherein $0.05 \leq x \leq 0.5$ and $0.05 \leq y \leq 0.2$, or $(A_{1-x}B_{1+x})(C_{3-x}D_{2x-2y}B_{1-x+y}Nb_y)O_8$, wherein $0.05 \leq x \leq 0.9$ and $0.05 \leq y \leq 0.2$, and wherein $x \geq y$, or $(A_{1-x}B_{1+x})(C_{3-x-3y}D_{2x}B_{1-x}Nb_{2y}Ni_y)O_8$, wherein $0.05 \leq x \leq 0.9$ and $0.05 \leq y \leq 0.2$, wherein A is at least one element selected from Co, Zn, Ca, Mg and Cu, wherein B is at least one element selected from Li and Na, wherein C is at least one element selected from Ti, Mn Sn and Ge, and wherein D is at least one element selected from Cr, B, Fe, Mn and Al.

Thus a green pigment is provided, which contains nickel and/or niobium. The pigment according to the invention can be used in paints and coatings and for dyeing in diverse plastics, rubber, ceramics and glass.

According to another advantageous feature of the present invention, the pigment may be a nickel-containing mixed oxide of the formula $(Co_{1-x}Li_{1+x})(Ti_{3-x-y}Cr_{2x}Li_{1-x-2y}Ni_{3y})O_8$ or $(Co_{1-x}Li_{1+x})(Ti_{3-x}Cr_{2x-y}Li_{1-x-y}Ni_{2y})O_8$, a niobium-containing mixed oxide of the formula $(Co_{1-x}Li_{1+x})(Ti_{3-x-4y}Cr_2xLi_{1-x+y}Nb_{3y})O_8$ or $(Co_{1-x}Li_{1+x})(Ti_{3-x}Cr_{2x-2y}Li_{1-x+y}Nb_y)O_8$, and a nickel- and niobium-containing mixed oxide of the formula $(Co_{1-x}Li_{1+x})(Ti_{3-x-3y}Cr_2xLi_{1-x}Nb_{2y}Ni_y)O_8$.

Even when the pigment contains nickel, the pigment does not present a health risk because the pigment has a low nickel release according to DIN EN 71.3:2013-05. The pigment according to the invention also has a low cobalt release.

The green pigment in particular has a nickel release of less than 80 mg/kg and a cobalt release of less than 30 mg/kg.

According to another advantageous feature of the present invention, the pigment according to the invention at a dilution of 10% pigment in plastisol has an L* value of 15 to 85, an a* value of −1 to −70 and a b* value of 1 to 40.

According to another advantageous feature of the present invention, the pigment according to the invention at a dilution of 10% pigment in plastisol has an L* value of 45 to 55, an a* value of −26 to −40 and a b* value of 11 to 17.

According to another advantageous feature of the present invention, the pigment according to the invention at a dilution of 2% pigment and 10% titanium oxide in plastisol has an L* value of 40 to 120, an a* value of −1 to −60 and a b* value of 1 to 40.

According to another advantageous feature of the present invention, the pigment according to the invention at a dilution of 2% pigment and 10% titanium oxide in plastisol has an L* value of 75 to 92, an a* value of −15 to −23 and a b* value of 5 to 11.

According to another aspect of the present invention, a method for producing a green pigment includes the following steps:

i) producing a mixture by mixing the carbonates, nitrates, oxalates, phosphates, hydroxides, fluorides, borates, or corresponding metal organic compounds of metals selected from Co, Zn, Ca, Mg, Cu, Li, Na, Ti, Mn, Sn, Ge, Cr, B, Fe, Mn Al, Ni, Nb, Ni and Nb; and ii) calcining the mixture at a temperature of from 900° C. to 1400° C. for 1 h to 3 h to form a pigment of a formula selected from the following formulas a) $(A_{1-x}B_{1+x})(C_{3-x-y}D_{2x}B_{1-x-2y}Ni_{3y})O_8$, wherein $0.05 \leq x \leq 0.9$ and $0.05 \leq y \leq 0.5$, and wherein $x+2y \leq 1$;

b) $(A_{1-x}B_{1+x})(C_{3-x-y}D_{2x-y}B_{1-x-y}Ni_{2y})O_8$, wherein $0.05 \leq x \leq 0.5$ and $0.05 \leq y \leq 0.5$;

c) $(A_{1-x}B_{1+x})(C_{3-x-4y}D_{2x}B_{1-x+y}Nb_y)O_8$, wherein $0.05 \leq x \leq 0.5$ and $0.05 \leq y \leq 0.2$;

d) $(A_{1-x}B_{1+x})(C_{3-x}D_{2x-2y}B_{1-x+y}Nb_y)O_8$, wherein $0.05 \leq x \leq 0.9$ and $0.05 \leq y \leq 0.2$, and wherein $x \geq y$; and e) $(A_{1-x}B_{1+x})(C_{3-x-3y}D_{2x}B_{1-x}Nb_{2y}Ni_y)O_8$, wherein $0.05 \leq x \leq 0.9$ and $0.05 \leq y \leq 0.2$, wherein A is at least one element selected from Co, Zn, Ca, Mg and Cu, wherein B is at least one element selected from Li and Na, wherein C is at least one element selected from Ti, Mn, Sn and Ge, and wherein D is at least one element selected from Cr, B, Fe, Mn and Al.

The mixing can be carried out wet or dry.

According to another advantageous feature of the present invention, the calcining of the mixture is carried out at a temperature of 900° C. to 1200° C.

According to another advantageous feature of the present invention, the product is subsequently milled in a ball mill.

According to another aspect of the present invention, a paint composition, a plastic or a coating contain the pigment according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
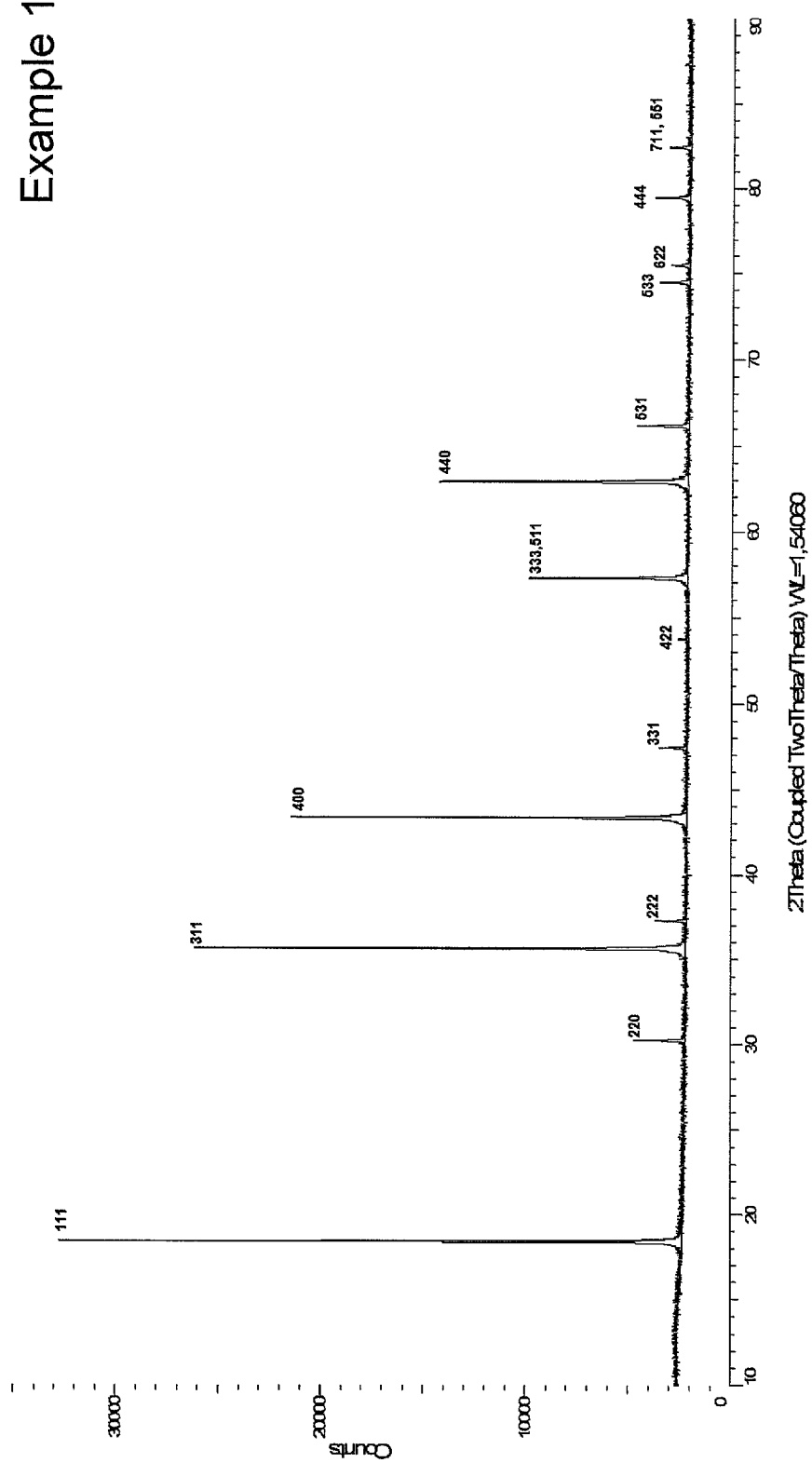
FIG. 1 shows an x-ray diffraction diagram of the compound of Example 1.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The method according to the invention is explained in more detail by way of exemplary embodiments.

Example 1

$(Li_{1.5}Co_{0.5})(Ti_{2.4}Li_{0.525}CrNb_{0.075})O_8$

FIG. 1 shows an x-ray diffraction diagram of the compound of Example 1. The x-ray diffraction diagram shows that the spinel is generated free of phase shift with integrated niobium.

The composition $(Li_{1.5}Co_{0.5})(Ti_{2.4}Li_{0.525}CrNb_{0.075})O_8$ was produced by dry-mixing the metal oxides and/or carbonates of Table 1. Subsequently the mixture was annealed at a temperature of 960° C. for 2 h and the product was then milled in a ball mill.

TABLE 1

|  | kg |
| --- | --- |
| Lithium Carbonate | 19.02 |
| Cobalt Oxide | 9.53 |
| Titanium Oxide | 48.74 |
| Chromium Oxide | 19.33 |
| Niobium Oxide | 3.38 |
| Nickel Oxide | / |
|  | 100 |

The pigment $(Li_{1.5}Co_{0.5})(Ti_{2.4}Li_{0.525}CrNb_{0.075})O_8$ has the following color properties:

Volton (10% pigment in plastisol) (CIELab D65 10°):

| L* | 47.4 |
| --- | --- |
| a* | -31.3 |
| b* | 15.4 |

Dilution (2% pigment and 10% Titanium oxide in plastisol) (CIELab D65 10°):

| L* | 88.1 |
| --- | --- |
| a* | -17.5 |
| b* | 6.9 |

Example 2

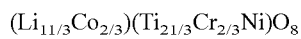
$(Li_{11/3}Co_{2/3})(Ti_{21/3}Cr_{2/3}Ni)O_8$

Figure 2:
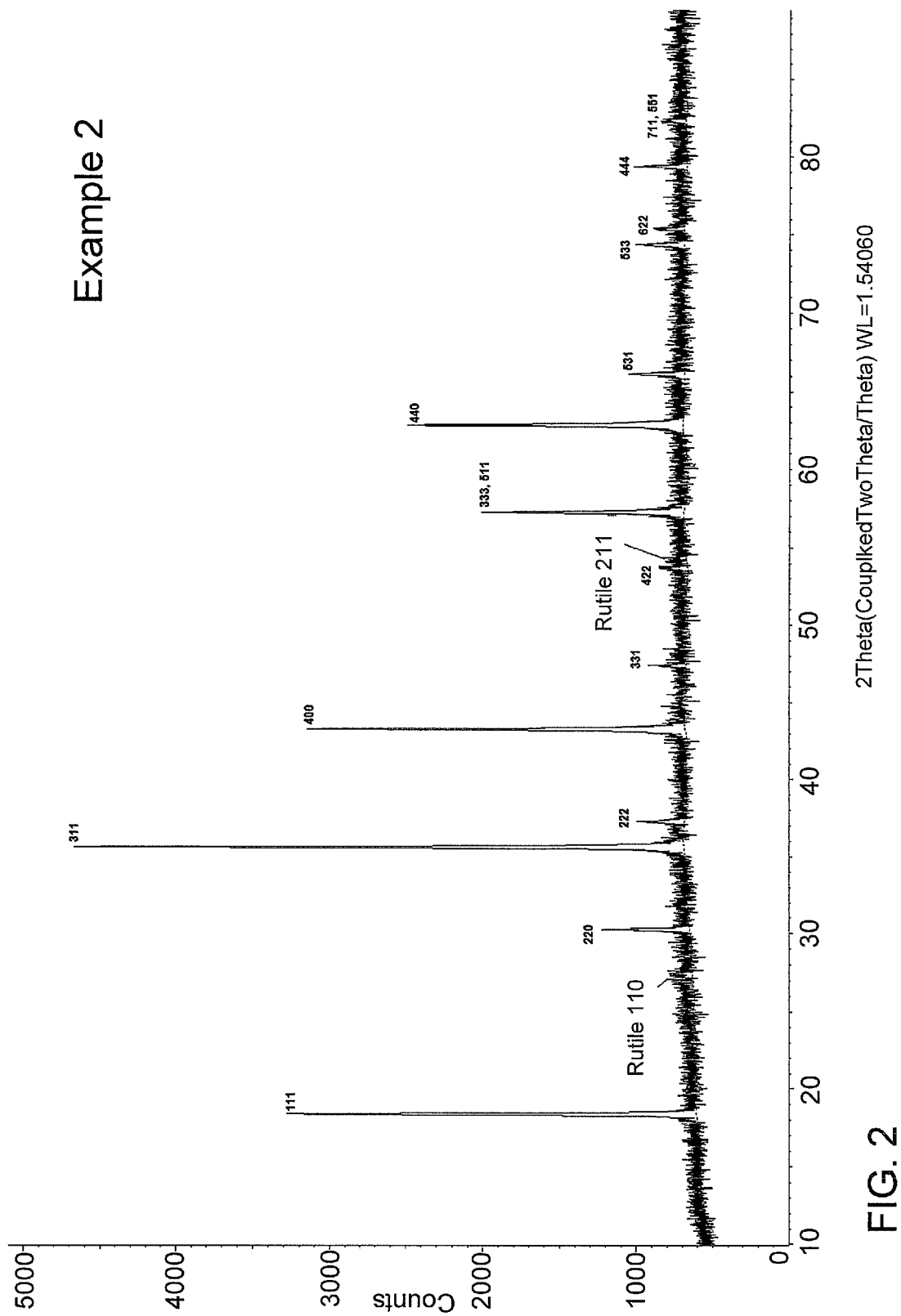
FIG. 2 shows an x-ray diffraction diagram of the compound of Example 2.

FIG. 2 shows an x-ray diffraction diagram of the compound of Example 2. The x-ray diffraction diagram shows that in addition to the spinel a small proportion of a rutile phase is generated.

The composition $(Li_{11/3}Co_{2/3})(Ti_{21/3}Cr_{2/3}Ni)O_8$ was produced by dry mixing the metal oxides and/or carbonates of Table 2. Subsequently the mixture was annealed at a temperature of 960° C. for 2 h and the product was then milled in a ball mill.

TABLE 2

|  | kg |
| --- | --- |
| Lithium Carbonate | 11.83 |
| Cobalt Oxide | 13.02 |
| Titanium Oxide | 44.78 |
| Chromium Oxide | 12.18 |
| Niobium Oxide | / |
| Nickel Oxide | 18.19 |
|  | 100 |

The pigment $(Li_{11/3}Co_{2/3})(Ti_{21/3}Cr_{2/3}Ni)O_8$ has the following color properties:

Volton (10% pigment in plastisol) (CIELab D65 10°):

| L* | 50.4 |
| --- | --- |
| a* | -36.4 |
| b* | 16.2 |

Dilution (2% pigment and 10% Titanium oxide in plastisol) (CIELab D65 10°):

| L* | 79.7 |
| --- | --- |
| a* | -21.3 |
| b* | 9.3 |

In addition the Nickel release and Cobalt release of the pigment was determined by measuring the solubility over a time period of 2 h in 1 n HCl. Hereby a Nickel release of 71 mg/kg and a Cobalt release of 28 mg/kg could be determined.

Example 3

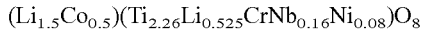
$(Li_{1.5}Co_{0.5})(Ti_{2.26}Li_{0.525}CrNb_{0.16}Ni_{0.08})O_8$

Figure 3:
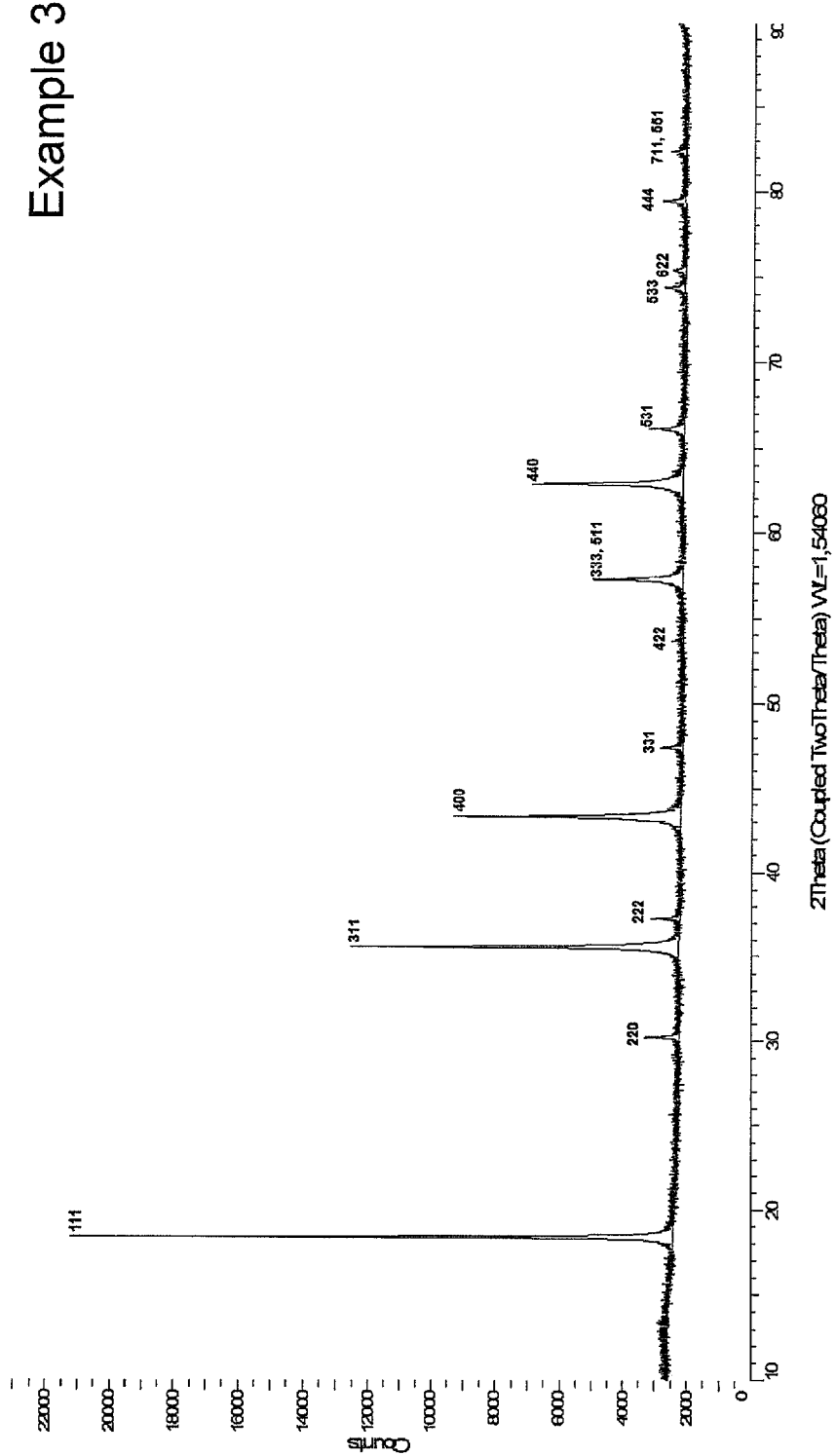
FIG. 3 shows an x-ray diffraction diagram of the compound of Example 3.

FIG. 3 shows an x-ray diffraction diagram of the compound of Example 3. The x-ray diffraction diagram shows that the spinel is generated free from phase shift with integrated Nb and Ni.

The composition $(Li_{1.5}Co_{0.5})(Ti_{2.26}Li_{0.525}CrNb_{0.16}Ni_{0.08})O_8$ was produced by dry mixing the metal oxides and/or carbonates of Table 3. Subsequently the mixture was annealed at a temperature of 1100° C. for 2 h and the product was then milled in a ball mill.

TABLE 3

|  | kg |
| --- | --- |
| Lithium Carbonate | 18.72 |
| Cobalt Oxide | 9.49 |
| Titanium Oxide | 45.56 |
| Chromium Oxide | 19.25 |
| Niobium Oxide | 5.43 |
| Nickel Oxide | 1.55 |
|  | 100 |

The pigment $(Li_{1.5}Co_{0.5})(Ti_{2.26}Li_{0.525}CrNb_{0.16}Ni_{0.08})O_8$ has the following color properties:

Volton (10% pigment in plastisol) (CIELab D65 10°):

| L* | 49.5 |
| --- | --- |
| a* | −29.9 |
| b* | 12.1 |

Dilution (2% pigment and 10% Titanium oxide in plastisol) (CIELab 065 10°):

| L* | 80.6 |
| --- | --- |
| a* | −17.6 |
| b* | 7.1 |

Figure 4:
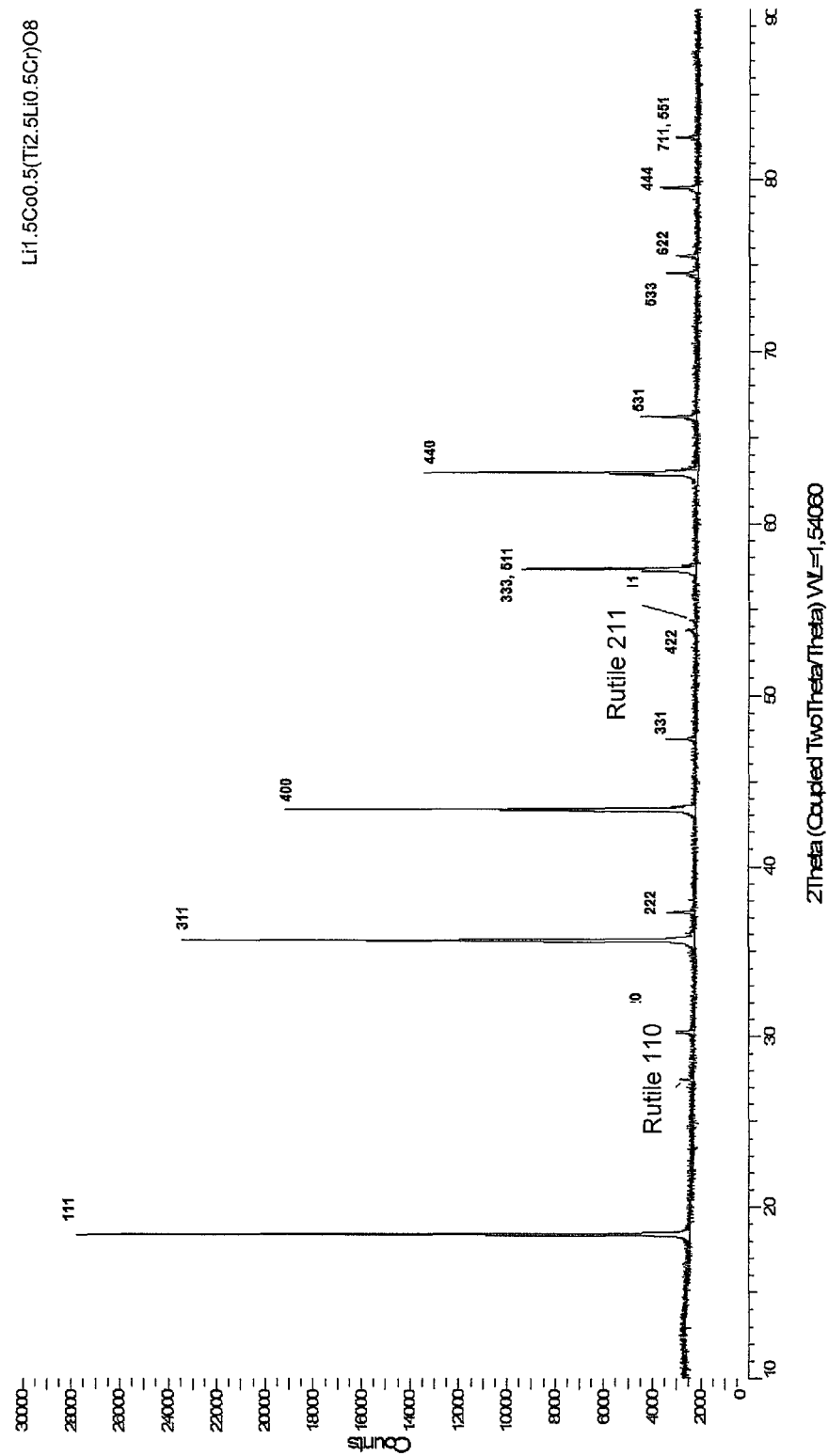
FIG. 4 shows an x-ray diffraction diagram of the compound $Li_{1.5}Co_{0.5}(Ti_{2.5}Li_{0.5}Cr)O_8$.

FIG. 4 shows an x-ray diffraction diagram of the compound $Li_{1.5}Co_{0.5}(Ti_{2.5}Li_{0.5}Cr)O_8$. The x-ray diffraction diagram shows that in addition to the spinel a small proportion of a rutile phase is generated.

Figure 5:
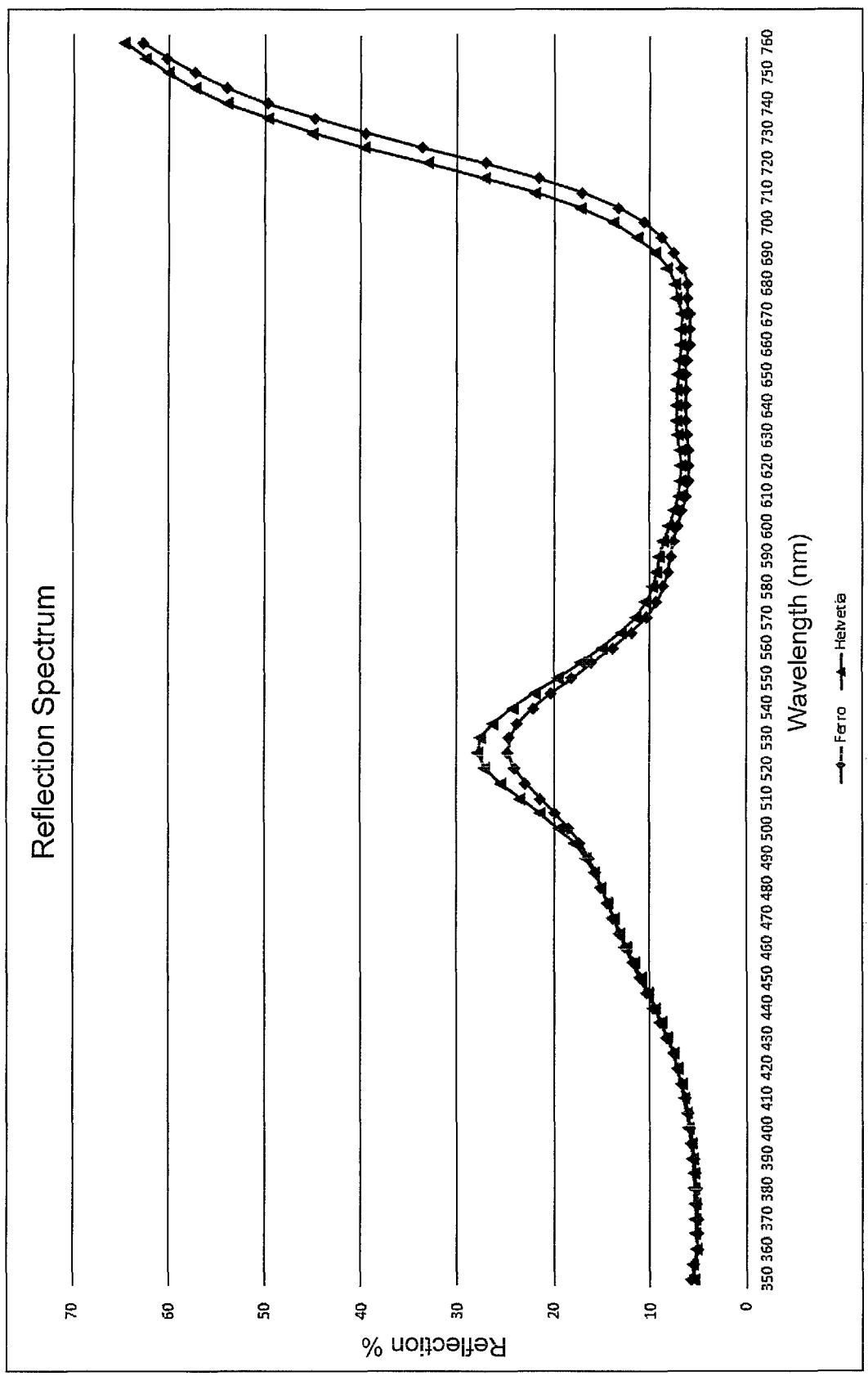
FIG. 5 shows a reflection spectrum of the pigment according to the invention and a reflection spectrum of a known green pigment.

FIG. 5 shows a reflection spectrum of the pigment according to the invention (designated "Helvetia" in FIG. 5) and a reflection spectrum of a known green pigment according to U.S. Pat. No. 9,187,617B1 of the Ferro Corporation (designated "Ferro" in FIG. 5).

What is claimed as new and desired to be protected by Letters Patent is set forth in the appended claims and includes equivalents of the elements recited therein:

1. A green pigment, comprising a material with spinel structure of a formula selected from the following formulas:
 a) $(A_{1-x}B_{1+x})(C_{3-x-y}D_{2x}B_{1-x-2y}Ni_{3y})O_8$, wherein $0.05 \leq x \leq 0.9$ and $0.05 \leq y \leq 0.5$, and wherein $x+2y \leq 1$;
 b) $(A_{1-x}B_{1+x})(C_{3-x-y}D_{2x-y}B_{1-x-y}Ni_{2y})O_8$, wherein $0.05 \leq x \leq 0.5$ and $0.05 \leq y \leq 0.5$;
 c) $(A_{1-x}B_{1+x})(C_{3-x-4y}D_{2x}B_{1-x+y}Nb_y)O_8$, wherein $0.05 \leq x \leq 0.5$ and $0.05 \leq y \leq 0.2$;
 d) $(A_{1-x}B_{1+x})(C_{3-y}D_{2x-2y}B_{1-x+y}Nb_y)O_8$, wherein $0.05 \leq x \leq 0.9$ and $0.05 \leq y \leq 0.2$, and wherein $x \geq y$; and
 e) $(A_{1-x}B_{1+x})(C_{3-x-3y}D_{2x}B_{1-x}Nb_{2y}Ni_y)O_8$, wherein $0.05 \leq x \leq 0.9$ and $0.05 \leq y \leq 0.2$,
wherein in said formulas A is at least one element selected from Co, Zn, Ca, Mg and Cu, B is at least one element selected from Li and Na, C is at least one element selected from Ti, Mn, Sn and Ge, and D is at least one element selected from Cr, B, Fe, Mn and Al.

2. The green pigment of claim 1, wherein the green pigment is a nickel-containing mixed oxide selected from $(Co_{1-x}Li_{1+x})(Ti_{3-x-y}Cr_{2x}Li_{1-x-2y}Ni_{3y})O_8$ and $(Co_{1-x}Li_{1+x})(Ti_{3-x}Cr_{2x-y}Li_{1-x-y}Ni_{2y})O_8$.

3. The green pigment of claim 1, wherein the green pigment is a niobium-containing mixed oxide selected from $(Co_{1-x}Li_{1+x})(Ti_{3-x-4y}Cr_{2x}Li_{1-x+y}Nb_{3y})O_8$, and $(Co_{1-x}Li_{1+x})(Ti_{3-x}Cr_{2x-2y}Li_{1-x+y}Nb_y)O_8$.

4. The green pigment of claim 1, wherein the green pigment is a nickel and niobium containing mixed oxide of the formula $(Co_{1-x}Li_{1+x})(Ti_{3-x-3y}Cr_{2x}Li_{1-x}Nb_{2y}Ni_y)O_8$.

5. The green pigment of claim 1, having a nickel release of less than 80 mg/kg and a Cobalt release of less than 30 mg/kg, according to DIN EN 71.3:2013-05.

6. A method for producing a green pigment, said method comprising the steps of:
 producing a mixture by mixing carbonates, nitrates, oxalates, phosphates, hydroxides, fluorides, borates, or corresponding metal organic compounds of metals selected from Co, Zn, Ca, Mg, Cu, Li, Na, Ti, Mn, Sn, Ge, Cr, B, Fe, Mn, Al, Ni and Nb; and
 calcining the mixture at a temperature from 900° C. to 1400° C. for 1 h to 3 h to form a pigment of a formula selected from the following formulas
 a) $(A_{1-x}B_{1+x})(C_{3-x-y}D_{2x}B_{1-x-2y}Ni_{3y})O_8$, wherein $0.05 \leq x \leq 0.9$ and $0.05 \leq y \leq 0.5$, and wherein $x+2y \leq 1$;
 b) $(A_{1-x}B_{1+x})(C_{3-x-y}D_{2x-y}B_{1-x-y}Ni_{2y})O_8$, wherein $0.05 \leq x \leq 0.5$ and $0.05 \leq y \leq 0.5$;
 c) $(A_{1-x}B_{1+x})(C_{3-x-4y}D_{2x}B_{1-x+y}Nb_y)O_8$, wherein $0.05 \leq x \leq 0.5$ and $0.05 \leq y \leq 0.2$;
 d) $(A_{1-x}B_{1+x})(C_{3-y}D_{2x-2y}B_{1-x+y}Nb_y)O_8$, wherein $0.05 \leq x \leq 0.9$ and $0.05 \leq y \leq 0.2$, and wherein $x \geq y$; and
 e) $(A_{1-x}B_{1+x})(C_{3-x-3y}D_{2x}B_{1-x}Nb_{2y}Ni_y)O_8$, wherein $0.05 \leq x \leq 0.9$ and $0.05 \leq y \leq 0.2$,
wherein in said formulas A is at least one element selected from Co, Zn, Ca, Mg and Cu, B is at least one element selected from Li and Na, C is at least one element selected from Ti, Mn, Sn and Ge, and D is at least one element selected from Cr, B, Fe, Mn and Al.

7. The method of claim 6, further comprising after the calcining step, milling the calcinated mixture in a ball mill.

8. A paint composition, a plastic or a coating containing the green pigment of claim 1.

* * * * *